United States Patent [19]

Collins et al.

[11] Patent Number: 4,541,692

[45] Date of Patent: Sep. 17, 1985

[54] TRANSFLECTIVE LIQUID CRYSTAL DISPLAY WITH ENHANCED CONTRAST RATIO

[75] Inventors: Robert P. Collins, Boxford, Mass.; Elias S. Haim, Windham, N.H.; John A. Rowen, Lynnfield, Mass.

[73] Assignee: General Electric Company, Schenectady, N.Y.

[21] Appl. No.: 499,572

[22] Filed: May 31, 1983

[51] Int. Cl.[4] .............................................. G02F 1/13
[52] U.S. Cl. ................................. 350/339 R; 350/345; 350/339 D
[58] Field of Search ............... 350/339 R, 339 F, 345, 350/337, 339 D, 349

[56] References Cited

U.S. PATENT DOCUMENTS

| | | | |
|---|---|---|---|
| 3,950,078 | 4/1976 | Zatsky | 350/337 X |
| 4,042,294 | 8/1977 | Billings, Jr. et al. | 350/345 |
| 4,188,094 | 2/1980 | Fergason | 350/337 |
| 4,294,518 | 10/1981 | O'Connor et al. | 350/335 X |
| 4,398,805 | 8/1983 | Cole | 350/349 X |

*Primary Examiner*—John K. Corbin
*Assistant Examiner*—Richard F. Gallivan
*Attorney, Agent, or Firm*—David Blumenfeld

[57] ABSTRACT

A back lighted transflective liquid crystal display with improved contrast ratio has a light mask positioned between the transflective element and the source of back lighting. The mask has light transmitting sections which are aligned with and have the same configuration as the indicia-forming electrodes in the cell. The mask has opaque or light blocking sections that are aligned with the background portion of the cell. In the transmissive mode light impinges on the cell only in the area of the indicia-forming electrodes, thereby enhancing the contrast ratio between the indicia and background portions of the cell.

6 Claims, 4 Drawing Figures

TRANSFLECTIVE LIQUID CRYSTAL DISPLAY WITH ENHANCED CONTRAST RATIO

The present invention relates to liquid crystal displays and, more particularly, to a novel transflective liquid crystal display with increased contrast ratio.

BACKGROUND OF THE INVENTION

Liquid crystal display devices are now well known and widely used in a variety of applications. One of the principal reasons for their popularity is their small size and low power consumption. In particular, liquid crystal cells of the host-guest variety have become increasingly popular because they do not require polarizers; they have color capability; and they are intrinsically brighter than other types of liquid crystal cells.

One of the most significant forms of guest-host liquid crystal cells is one in which a pleochroic dye is dissolved in the liquid crystal host. The host liquid crystal, in the preferred form, contains an optically active (chiral) material which causes the liquid crystal molecules to exhibit a helical order with their optical or nematic director parallel to the cell substrate. The optically active material is preferably a cholesteric compound although other materials may be used. Pleochroic dyes are characterized by the fact that they exhibit anisotropic optical behavior; i.e., light is absorbed along one axis of the dye molecule (the long axis) and is transmitted along the other axis. The guest dye molecules dissolved in the liquid crystal host spontaneously align themselves with the helically ordered liquid crystal molecule so that their long, or light-absorbing axes are also parallel to the cell substrate.

In the absence of an electric field, the dye molecules are aligned in a helical order with their long axes parallel to the cell electrodes, and absorb light passing through the cell. When an electric field is applied to the cell, the helix unwinds and the host liquid crystal molecules assume a homeotropic order, i.e., at right angles to the cell electrodes. The guest dye molecules align themselves similarly. As a result, the long axes of the dye molecules also assume a homeotropic order and are oriented to transmit light through the cell.

The effectiveness of the guest dye molecules in absorbing light depends on the degree to which they are aligned with the host liquid crystal molecules. Unless there is a high degree of alignment, (i.e., a high order parameter) some light will be transmitted even though the cell is in the light absorbing or non-transmissive state. In addition, light is elliptically polarized in passing through a liquid crystal host with helical molecular ordering so that a fraction of the light is transmitted even in the absence of an electric field. For these reasons, imperfect ordering and elliptical light polarization, some light is always transmitted through the background portions even though the host liquid crystal and the guest dye in these background portions are helically ordered. The principal result is that the contrast ratio between the indicia and background portions of the cell is not high; with contrast ratios in the order of 4:1 to 10:1 being typical.

A number of solutions have been proposed for making the background portion darker and increasing the contrast ratio. One such solution is to increase cell spacing. However, when the cell spacing is increased, cell brightness is reduced and the cell driver voltage required to unwind the helix is increased, thus making this a far from ideal solution. It has also been suggested that background absorption can be increased and contrast ratio improved by increasing the dye concentration in the liquid crystal host. However, because of the relatively low solubility of dichroic dyes in the liquid crystal host, and the reduced brightness, this solution is also of limited usefulness.

Applicant has found that the contrast ratio of a backlighted transflective liquid crystal display can be enhanced by orders of magnitude to produce contrast ratios in the range of 500-600:1.

The improvement in contrast ratio is brought about by ensuring that in the transmissive mode light from the rear of the cell only passes through the areas of the indicia-forming electrodes while virtually completely blocking illumination of the background portions of the cell. This is achieved by providing a light mask between the light source and transflector at the rear of the cell. The mask has light transmitting portions which are spatially aligned with, and have the same shape as, the indicia-forming cell electrodes. The remaining portion of the mask is opaque and essentially blocks all light from the background portion of the cell. In this fashion, the contrast ratio of the display is enhanced and the illuminated display indicia are much more readily visible than is the case without the use of the contrast enhancing light masking means.

The term "transflective" liquid crystal device is used broadly to describe an arrangement in which a liquid crystal cell may be operated in a reflective mode, a transmissive mode, or simultaneously in both modes. In the reflective mode light, whether ambient or from a specific source, enters the front of the cell and passes through the liquid host-guest solution to a reflector contained either within or in back of the cell. The light striking the reflector passes back through the solution to the front plate. In the transmissive mode, light from a source positioned in the back of the cell illuminates the rear of a transflective element which reflects most of the light striking its front face while passing a portion of any light illuminating its rear. In the transmissive mode, light illuminating the rear passes directly through the liquid crystal host-guest solution to the front of the cell. Transflective LCD's are sometimes used as instrument displays in an aircraft cockpit. During daylight, when the ambient lighting level is high, the LCD is operated in the reflective mode only by de-energizing the back lighting source. At night, with essentially no ambient light, the source of back lighting is energized and the cell is operated in a transmissive mode only. At other times, particularly during twilight, the LCD may be operated in both the reflective and the transmissive mode.

SUMMARY OF THE INVENTION

It is therefore a principal objective of the instant invention to provide a liquid crystal display device with enhanced contrast ratio between the indicia and the background portion of the device.

Another objective of the invention is to provide improved contrast ratios for liquid crystal devices of the transmissive type.

Yet another objective of the invention is to provide a liquid crystal display with enhanced contrast ratio when operated in a transflective mode.

Still another objective of the invention is to provide a backlighted liquid crystal display with enhanced contrast ratio while in the backlighted mode.

Still another objective of the invention is to provide a transflective liquid crystal display in which light is selectively blocked from the background portion to enhance the contrast ratio.

Other objectives and advantages of the invention will become apparent as the description thereof proceeds.

The various objectives and advantages of the invention are realized in a transflective liquid crystal display device characterized by the presence of a light masking element between the liquid crystal cell and the back lighting source. In the transmissive mode, light is transmitted through the mask only in those areas aligned with the indicia-forming electrodes of the cell and is blocked in the area aligned with the background portion of the cell. Because light passes only through the indicia portions without any light impinging on the background, the contrast ratio of the liquid crystal cell is substantially increased; with contrast ratios in the order of 500-600:1 now being possible.

BRIEF DESCRIPTION OF THE DRAWING FIGURES

The novel features which are believed to be characteristic of this invention are set forth in the appended claims. The invention itself, however, both as to its organization and mode of operation, together with further objectives and advantages thereof, may best be understood by reference to the following description taken in connection with the accompanying drawings in which:

FIG. 4 is a partially broken away perspective of an elastomeric connector used in the display.

DETAILED DESCRIPTION OF THE PREFERRED EMBODIMENTS

Figure 1:
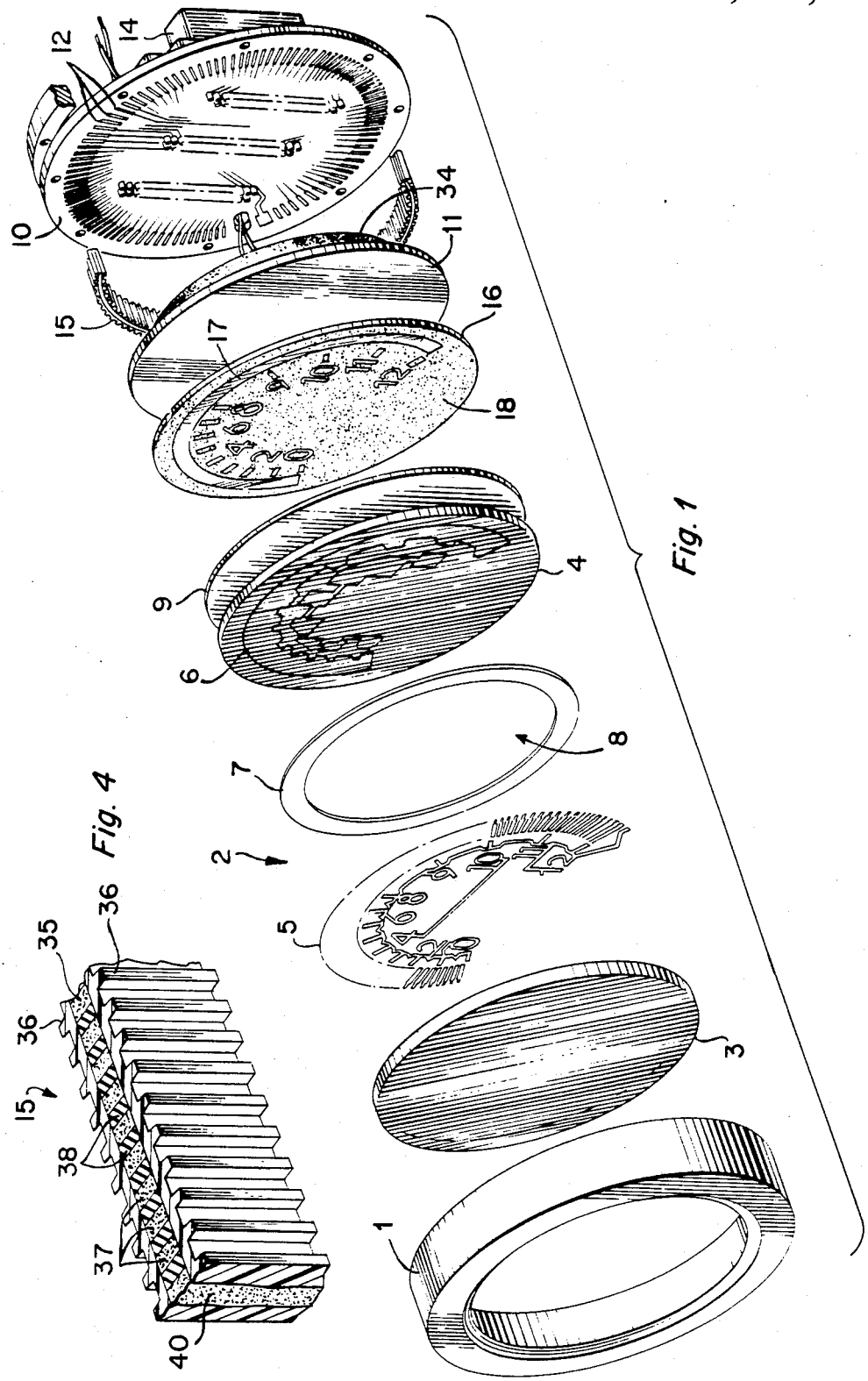
FIG. 1 is an exploded view of a liquid crystal display device with the enhanced contrast ratio according to the instant invention.

FIG. 1 shows an exploded, perspective view of a transflective liquid crystal display incorporating the various features of the invention. For purposes of clarity and ease of explanation, the indicia defining, optically transparent electrodes on the back of the front plate are shown exploded away from the front substrate as though they were separate elements. It will be understood, however, that these electrodes are physically deposited on the rear face of the front plate of the cell. The liquid crystal display assembly includes a holder or bezel 1, which supports the display and has a suitable opening through which the indicia bearing portion of liquid crystal display device is visible. The display assembly includes a liquid crystal cell 2 comprising optically transparent front and rear plates 3 and 4. Optically transparent conductive electrodes, shown generally at 5 and 6, are deposited on the selected portions of the inner surfaces of the plates. A plastic or glass frit seal 7 between the outer periphery of back plate 4 and front plate 3 seals the two plates to form chamber 8 which retains the host-guest liquid crystal mixture.

Positioned behind cell 2 is a transflective element 9 which is characterized by the fact that it will reflect substantially all (90% or more) of any ambient light which enters cell 2 from the front and passes through the optically transparent electrodes. Transflector 9 is also capable of transmitting a portion of any light illuminating its rear surface.

Positioned behind transflector 9 is a printed circuit board assembly 10 which resiliently supports a light source 11. Light source 11 is shown in the form of a planar, electro-luminescent device. Also positioned on printed circuit board 10 are a plurality of conductive pads 12 which are connected by leads 13 through board 10 to multi-element connector 14 mounted on the back of the printed circuit board. This connector applies energizing voltages selectively to the optically transparent electrodes in the liquid crystal cell. An elastomeric connector band 15, presently to be described in detail, contains a plurality of conductive elements which establish conductive paths between pads 12 and similar conductive pads on front plate 3 and rear plate 4.

A contrast enhancing mask 16 is positioned between light source 11 and the back face of transflector 9. Mask 16 limits light transmission through the cell to the areas of the indicia-defining electrodes while blocking light to the background portion of the cell thereby enhancing the contrast ratio between the indicia and background portions of the cell. To this end, contrast enhancing light mask 16 contains a light transmitting portion 17 which corresponds in shape and spatial alignment to the optically transparent, indicia-defining electrodes of the cell. The remaining portion of mask 16 which corresponds to the background portion of the cell, is opaque and blocks substantially all light from light source 11. Mask 16 may be fabricated in a variety of ways. However, the easiest and most desirable manner of fabricating the mask is photographically.

Because the light mask is positioned behind the transflector, it is effective in enhancing contrast ratio when the display is in the back lighted transmissive mode, but is completely hidden from view when the LCD display is operated in the reflective mode.

The transflective element may take a variety of forms. The transflector may, for example, be a transparent glass plate having a white reflectance coating of barium sulfate. It is deposited on the plate as a slurry of barium sulfate in a water and alcohol solvent which contains a small percentage of polyvinyl alcohol binder. Such a slurry is obtainable from the Kodak Company under its commercial designation 6080 White Reflectance Coating. The slurry is deposited on the transparent glass plate and air dried to evaporate the solvent. The dried barium sulfate reflective coating may then be sealed by spray painting with a white acrylic laquer in order to give additional physical strength to the barium sulfate reflectance layer. Alternatively, very thin synthetic fiber papers, of which polypropylene is an example, with varying degress of thickness and opacity to control both the reflectance and the transmissivity, are now available from various paper companies and can be used.

The front face of the cell has a display portion which visually defines the shape of one or more indicia. The visual display indicia are defined by means of conductive, light-transmitting electrodes deposited on the interior surfaces of the substrate, i.e., the surfaces exposed to the host-guest liquid crystal solution disposed between the substrates.

For the purposes of the instant invention, the term indicia is broad and all-encompassing and includes range marks, bars, bar sections, numerals, letters or any other form of visible indications. Nor need the numerals or letters be of a continuous nature, in fact, the numerals may be of the well-known seven-segment type in which selective energization of the segments in various combinations produces numerals from 0 to 9.

Liquid crystal cell 2 thus essentially comprises two (2) optically transparent face plates or substrates which are joined by means of a seal to define a closed space which retains a liquid crystal dichroic-cholesteric solution. A plurality of optically-transparent, electrically-conductive segments or electrodes preferably of a material such as indium-tin oxide are deposited on the inner surfaces of the substrates, i.e., the surface facing the liquid crystal. The optically transparent electrodes define the indicia-forming elements on one of the substrates. In the reflective mode, the transparent front plate is exposed to ambient, or other, light which passes through the optically transparent electrode portions from the front and is reflected back from transflector 9. In the transmissive mode with source 11 energized, a portion of light, from source 11 passes through transflector 9 and directly through the indicia defining electrode segments and the liquid.

The liquid crystal solution retained between plates 3 and 4 is of the host-guest type in which the liquid crystal host contains an optically active chiral additive. Chiral additives include cholesterol related compounds such as cholesterol nonoate or optically active biphenyls. The chiral additive imparts a helical molecular orientation to the liquid crystal so that the nematic or optical axes of individual molecules are parallel to the plates but the molecules are helically distributed. The guest dye is characterized by molecules having anisotropic optical characteristics; i.e., the molecules absorb light along one axis and transmit light along the other axis (the long axis), and by the fact that the molecules spontaneously align with the host crystal molecules. Therefore, in the absence of an electric field, i.e., with the liquid crystal molecules aligned in a helical order, the dye molecules are also aligned in a helical molecular order and the optical axes of the dye molecules are so aligned that light is absorbed and the cell is dark.

When an electric field is applied to any part of the host-guest mixture, the helix in that part unwinds so that the liquid crystal host molecules assume a homeotropic alignment with respect to the cell plates. The guest dyes spontaneously align themselves in the same manner; i.e., in a homeotropic alignment with respect to the cell plates, whereby their long or optical axes are now aligned to pass light, thereby producing illumination of the cell along the indicia-defining electrodes.

Dichroic dyes of various colors, and chemical families (such as azo dyes, and anthroquinones, naphta quinones, etc.) are commercially available from sources such as E. M. Chemicals, and Hoffman-LaRoche.

The host liquid crystal may typically be a solution of biphenyl/pyrimedene of the type sold by the Hoffman-LaRoche Co., of Nutley, N.J., or E. M. Chemicals, Hawthorne, N.Y. Alternatively, compounds such as phenyl cyclohexanes, biphenyl cyclohexanes, cyanoesters, dioxanes, or terphenyls may be used. The chiral dopant is an optically active biphenyl such as that sold by E. M. Merck Co. under its trade designation CB-15.

Figure 2:
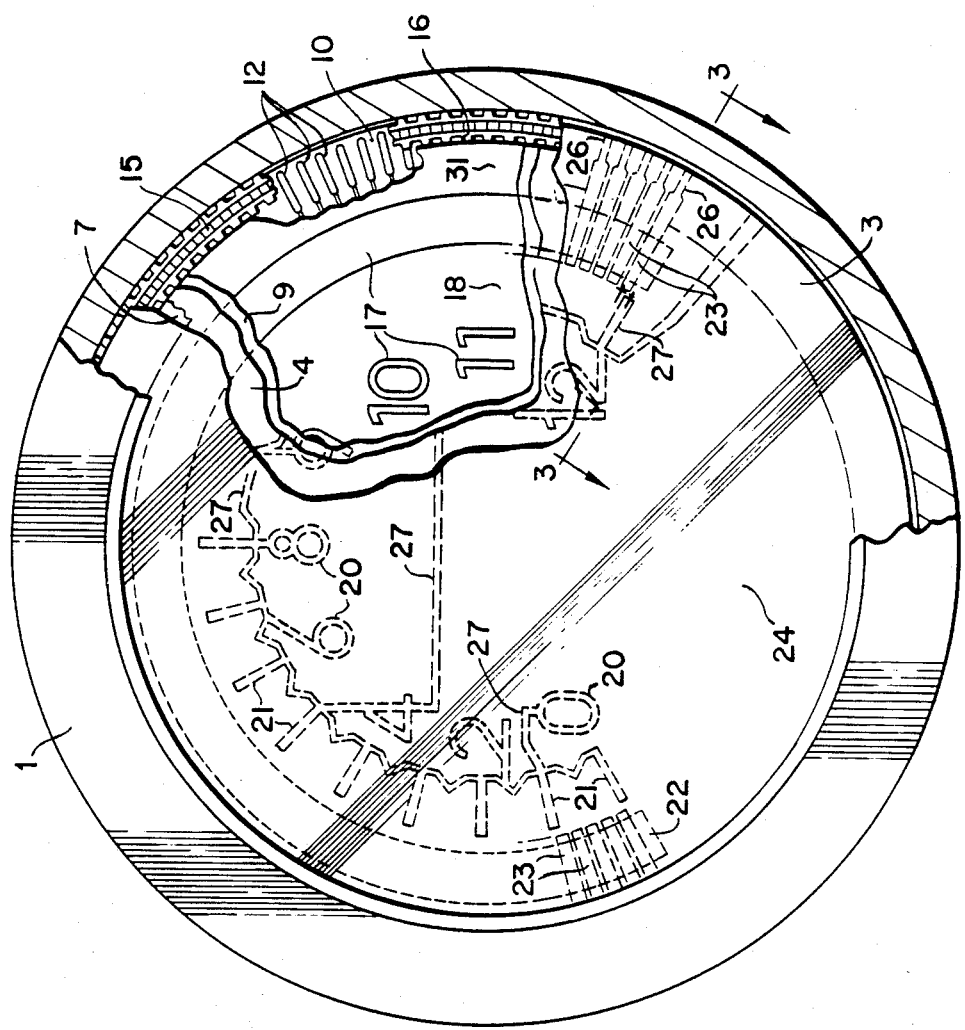
FIG. 2 is a partially broken away front elevational view showing the relative spatial alignments of the liquid crystal display components.

FIG. 2 shows a front view of the assembled transflective liquid crystal display. Bezel 1 and the remaining components are partially broken away to illustrate the relative alignment of the components shown in exploded form in FIG. 1. Bezel 1, front cell plate 3, rear cell plate 4, transflective element 9, contrast enhancing mask 16 and printed circuit board 10 are positioned behind each other in that sequence. Numerals 20, a plurality of range marks 21, and a circular bar graph 22 are displayed on front plate 3. Circular bar graph 22 is made up of a plurality of individual bar segments 23 which are selectively energized, thus representing the parameter to be displayed in the form of a movable circular bar graph. The remaining or background portion of the front plate is shown generally at 24. The indicia-defining bar segment electrodes 23 on the rear of front plate 3 are connected to a plurality of conductive pads 26 extending to the edge of the transparent front plate. These conductive pads are connected by means of elastomeric connector 15 to conductive pads 12 mounted on printed circuit board 10.

The elastomeric connector, as will be described in further detail with respect to FIGS. 3 and 4, includes a central conductive portion disposed between two insulating layers. The conductive central portion consists of alternate conductive and non-conductive segments which extend axially through the connector. Each conductive segment contacts a conductive pad 12 on the printed circuit board and a corresponding conductive pad 26 on the back side of front plate 3, selectively applying a voltage to these conductive segments when pad 12 is energized. A similar conductive pad on the inner surface of plate 4 contacts the optically transparent electrodes deposited on its inner surface. A separate pad on plate 3 is aligned therewith to apply voltage to those electrodes to apply the electric field to the liquid crystal solution between the indicia on both plates. This applies an electric field across the liquid crystal solution in the area of the bar segments so that light is transmitted through the segments causing selected indicia to be illuminated.

The electrode segments defining numerals 20 and range marks 21 are interconnected by means of the conductive strips 27 and are connected to a conductive pad 26 extending to the edge of the plate. Thus, once the cell is energized, the numerals and range marks are always illuminated. Bar graph segments 23 are energized only when voltage is applied to their associated pads to provide a moveable illuminated bar graph.

It can be readily noted that the contrast enhancing mask 16 includes clear or light transmitting portions 17 which are in exact alignment with the bar graph and other indicia-forming electrodes on the back side of the front plate while the opaque or light blocking portion 18 is in alignment with the background portion 24 of the front plate. Light from the electroluminescent source passes segments 17 of the mask and illuminates the back side of the transflective element but is completely blocked from the background portion of the cell. As a result light passes through the indicia-defining electrode portions of the cell while light is blocked from the background portion. The overall contrast ratio of the display is substantially enhanced so that contrast ratios in the order of 500–600:1 may be readily achieved whereas strictly reflective cells have contrast ratios of 4 or 5 with a maximum of 10:1. As a result, a very substantial improvement is realized in the contrast ratio for a transflective liquid crystal display assembly.

Figure 3:
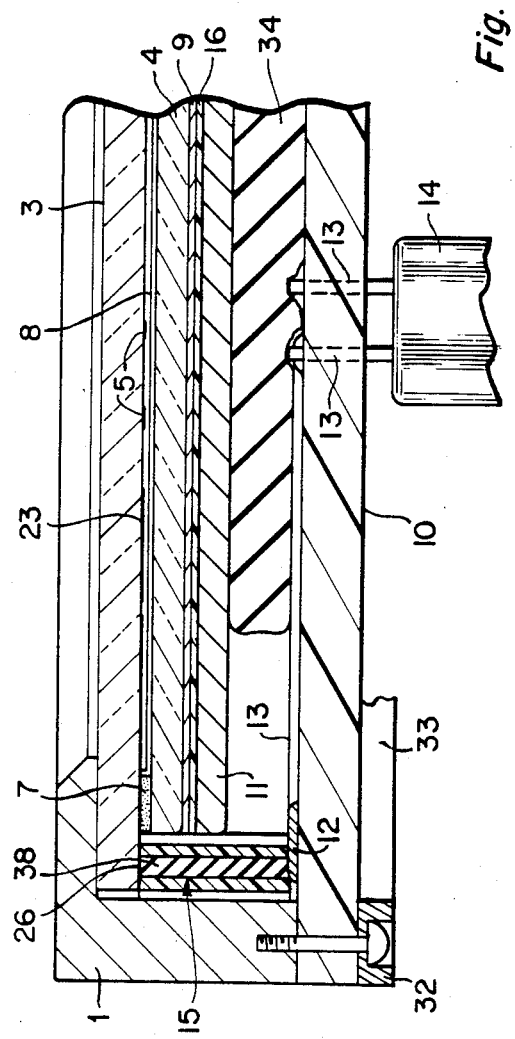
FIG. 3 is a sectional view taken along lines 3—3 of FIG. 2.

FIG. 3 is a sectional view taken along lines 3—3 of FIG. 2, and illustrates the manner in which elastomeric connector 15 establishes a conductive path between conductive pads 12 on the printed circuit board and corresponding conductive pads 26 on the rear of plate 3 of the liquid crystal cell. The cell assembly which is mounted in bezel 1 is secured by screws 32 which extend through a mounting ring 33 positioned against the back of printed circuit board 10 and into the bezel. Conductive leads 13 from pads 12 pass through the printed circuit boards to the connectors on the back side of the printed circuit board. Electroluminescent source 11 is supported by a resilient mounting pad 34 supported on board 10. Electroluminescent source 11 is positioned on the back of the contrast enhancing optical mask 16 which in turn abuts the back of the transflective element 9. Transflector 9 is, in turn, positioned against back plate 4 of liquid crystal cell 2.

Plates 3 and 4 and the plastic or glass frit seal 7 define chamber 8 in which a liquid crystal host-guest solution 36 is contained. Indicia-defining electrodes 5 and 6 are connected to conductive pads 26 on the plates.

The central layer of elastomeric connector 15 consists of alternate conductive and non-conductive segments with a conductive segment 35 consisting of carbon filled rubber, being shown in FIG. 3. Conductive segments 35 establish a conductive path between the printed circuit board and the electrodes to apply the voltage to the electrode segments in the cell and establish electric field across the liquid crystal solution.

FIG. 4 is a perspective illustration of elastomeric connector 15. It is shown in a greatly enlarged form for simplicity of description. Connector 15 consists of two (2) ribbed external insulating layers 36 which bound central layer 35. Layer 35 consists of a plurality of alternate conductive segments 37 and insulating segments 38. The conductive segments, which include a plurality of carbon particles 40 embedded in a rubber matrix, extend axially along the heighth of the connector.

The lateral spacing of the individual conductive and non-conductive segments is such that conductive pads 12 and 26 are more than twice as wide as the conductive segment so that at least one conductive segment in the connector is always in contact with the pads, thereby avoiding the effects of misregistration. Furthermore, the spacing between conductive pads 12 and conductive pads 26 is much greater than the width of conductive segments 37 so there is no possibility of a conductive segment in the connector short-circuiting adjacent conductive pads.

The elastomeric connector, as shown in FIG. 2, is positioned around the inner periphery of the bezel. Because the outer insulating layers are ribbed, rotational movement of the connector is minimized once the liquid crystal display device has been assembled in the bezel and the printed circuit board clamp to the bezel by means of the clamping ring and screws.

Elastomeric connectors of this type are commercially available. One commercially available connector is sold by HULTRONICS Co. under its trade designation STAX CONNECTOR.

The contrast ratio enhancing mask has been described as one in which the part of the mask that corresponds to the background portion of the cell is opaque and essentially blocks all light. While this maximizes contrast ratio, the invention is by no means limited to such an arrangement. The transmissivity of this part of the mask can be controlled to varying degrees and this, in turn, permits selective adjustment of the contrast ratio.

It will be evident from the foregoing that a liquid crystal display with substantially improved contrast ratio has been described.

While the instant invention has been described in connection with preferred embodiments thereof, the invention is by no means limited thereto since other modifications of the instrumentalities employed may be made and fall within the scope of the invention. It is contemplated by the appended claims to cover any such modifications that fall within the true scope and spirit of this invention.

What we claim as new and desire to secure by Letters Patent of the United States is:

1. A transflective liquid crystal display operable in transmissive and reflective modes with enhanced contrast ratio in the transmissive mode between the display indicia and the background portions comprising:
   (a) A single liquid crystal cell with display indicia,
   (b) A light source positioned to the rear of the single cell, said source being energized when the cell is operated in the transmissive mode
   (c) A transflective element between the rear of cell and said source, the rear of said transflective element being illuminated by said source when said source is energized,
   (d) Passive masking means positioned between said source and the transflective means for blocking rear illumination of the background portion of said cell, said masking means having light transmitting and light blocking portions, the light transmitting portions being aligned with the cell display indicia whereby said indicia are illuminated from the rear during the transmissive mode but light is blocked from the rear of the background portion of the cell to enhance contrast ratio between these portions.

2. The liquid crystal display according to claim 1 wherein said cell contains a host-guest solution in which the host liquid crystal contains an optically active element which imports a helical order to the crystal molecules and the guest is a pleochroic dye whose molecules spontaneously align with the crystal molecules.

3. A liquid crystal display device comprising:
   (a) A cell selectively operative in a transmissive or reflective mode comprising a pair of substantially parallel, spaced apart, substantially transparent substrates retaining a liquid crystal solution,
   (b) A plurality of optically transparent conductive electrode segments positioned on the surface of the substrate defining the front face of the cell, said electrode segments having configurations of the cell indicia,
   (c) A light source positioned behind the rear substrate element, adapted to be energized when the display is operated in the transmissive mode,
   (d) a transflective element positioned between light source and the rear of said cell, for reflecting ambient light entering the cell through the front face in the reflective mode and for transmitting a portion of the light striking rear face thereof when said light source is energized in the transmissive mode,
   (e) Passive contrast enhancing means positioned between said light source and said transflective means having light transmitting portions of the same configuration as, and aligned with, the optically transparent electrode segments of said liquid crystal cell, the remaining portion of said passive contrast enhancing means being essentially non-transmitting whereby light from the source behind the cell is transmitted through the display segments but is blocked from illuminating the background portion thereby enhancing the contrast ratio between the background and display portions of the liquid crystal device in the transmissive mode.

4. The liquid crystal display according to claim 3 wherein said cell contains a host-guest solution in which the host liquid crystal contains an optically active element which imports a helical order to the crystal molecules and the guest is a pleochroic dye whose molecules spontaneously align with the crystal molecules.

5. A liquid crystal display device comprising:
(a) A liquid crystal cell having a display portion for visually defining the shape of one or more indicia and a background portion, the display portion being defined by conductive light transmitting electrodes deposited on substrate of said cell,
Conductive energy light transmitting electrodes deposited on the liquid crystal surface of the other substrate element for selectively establishing electric fields across liquid crystal and controlling the light transmitting character of the liquid crystal solution in the area of the indicia defining electrode,
(b) means for selectively enhancing the contrast ratio between the indicia of the display portion and the background portion in the transmissive mode by controlled back lighting of the cell including:
  (1) a transflective means positioned behind said other substrate for reflecting ambient light passing through said cell in the reflective mode, said transflective means being capable of transmitting a portion of the light illuminating the rear of said transflective means in the transmissive mode,
  (2) A selectively energized light source,
  (3) and a masking means between said transflective means and said selectively energized light source,
said masking means having light transmitting portions aligned with and of the same configuration as the light transmitting electrodes and non-transmissive portions for blocking light from the background portion of said cell.

6. The liquid crystal display according to claim 5 wherein said cell contains a host-guest solution in which the host liquid crystal contains an optically active element which imports a helical order to the crystal molecules and the guest is a pleochroic dye whose molecules spontaneously align with the crystal molecules.

* * * * *